United States Patent [19]

Bushnell et al.

[11] 4,064,322
[45] Dec. 20, 1977

[54] ELECTROLYTE RESERVOIR FOR A FUEL CELL

[75] Inventors: Calvin L. Bushnell, Glastonbury; Harold Russell Kunz, Vernon, both of Conn.

[73] Assignee: United Technologies Corporation, Hartford, Conn.

[21] Appl. No.: 719,876

[22] Filed: Sept. 1, 1976

[51] Int. Cl.$^2$ ............................................. H01M 8/02
[52] U.S. Cl. ........................................ 429/41; 429/44
[58] Field of Search ..................... 429/39, 34, 40, 42, 429/44, 41

[56] References Cited
U.S. PATENT DOCUMENTS 3,905,832  9/1975  Trocciola ............................ 429/39

Primary Examiner—John H. Mack
Assistant Examiner—H. A. Feeley
Attorney, Agent, or Firm—Stephen E. Revis

[57] ABSTRACT

An electrolyte reservoir layer disposed behind and adjacent one of the catalyst layers of a fuel cell is porous and hydrophilic to the electrolyte. In one embodiment the reservoir layer includes impregnations of hydrophobic material on the catalyst facing surface thereof and holes leading from the other surface to the impregnations for providing reactant gas passages through the reservoir layer to the catalyst layer. The impregnations of hydrophobic material are designed to provide good distribution of the reactant gas into the catalyst layer without consuming a large volume of the reservoir. In a preferred embodiment the reservoir is also the electrode substrate whereby the catalyst layer is bonded to the surface thereof.

10 Claims, 4 Drawing Figures

ELECTROLYTE RESERVOIR FOR A FUEL CELL

RELATED APPLICATIONS

The following commonly owned U.S. patent applications were filed on even date herewith and include subject matter related to the present application:

"Electrolyte Reservoir for a Fuel Cell" by P. Grevstad

"Electrolyte Reservoir for a Fuel Cell" by J. Lamarine, R. Stewart, Jr. and R. Vine.

BACKGROUND OF THE INVENTION

1. Field of the Invention

This invention relates to fuel cells, and more particularly to electrolyte volume control within a fuel cell.

2. Description of the Prior Art

In a fuel cell, electrolyte is disposed between a pair of spaced apart electrodes. The electrodes often comprise a substrate and a catalyst; the substrate is provided simply to carry the catalyst and must be designed such that during operation the catalyst is in continuous contact with the electrolyte. The electrode must also be constructed to permit the reactant, such as gaseous hydrogen, to enter the substrate and also contact the catalyst. In the prior art it is generally considered that a three-phase interface is formed between the reactant gas, the catalyst, and the dectrolyte, at which place the electrochemical reaction occurs. Many early electrodes, such as those used in the cells described in U.S. Pat. Nos. 2,969,315 and 2,928,783 used porous nickel electrodes wherein the catalyst was distributed uniformly throughout the thickness of the entire electrode. These early cells incorporated a circulating electrolyte so that the water could be either added or removed external of the cell, thereby maintaining a relatively constant volume of electrolyte within the cell. In any event, small changes in electrolyte volume simply changed the location of the three-phase interface within the electrode substrate.

Later cells went to a non-circulating or trapped electrolyte disposed in a matrix sandwiched between the electrodes. In these cells water produced during operation is removed by evaporating it into one of the reactant gas streams. In order to reach the reactant gas stream water vapor must be able to pass through the electrode, yet one could not permit the electrode to completely fill with liquid since this might prevent the reactant gas from entering the electrode to react with the electrolyte at the catalyst sites. Efforts to avoid this type of problem resulted in the development of biporous electrodes. One such biporous electrode is described in U.S. Pat. No. 3,077,508 beginning at line 2 of column 4. As described therein, the biporous structure generally includes a large pore layer on the gas contacting side and a small or fine pore layer on the electrolyte contacting side. The fine pore layer would necessarily be activated with a catalyst. This might also be true of the large pore layer, although it is not a requirement. The high capillary action in the fine pore layer strongly held the electrolyte, while the large pore layer would remain relatively free from electrolyte and would therefore always permit the reactant gas to enter the electrode substrate. The electrochemical reaction took place at approximately the boundary between the large and small pore layers wherein a three-phase interface exists. However, the small pore layers of these early cells were generally very thin such that other provisions were required for electrolyte volume changes.

In an electrode having a catalyst uniformly distributed throughout the substrate it does not matter if, for example, the electrolyte fills half or three-quarters of the electrode thickness since there is always catalyst at the boundary between the electrolyte and reactant gas. Thus, it is only necessary that the reactant gas be able to penetrate through the portion of the electrode not filled with electrolyte. However, electrochemical activity only occurs at the three-phase interface, and catalyst not disposed at that interface does not react and is virtually being wasted. Further development led to electrodes wherein the catalyst was not dispersed throughout the entire substrate, but was rather applied as a very thin layer to the surface of the substrate adjacent the electrolyte. In that type of electrode it is required that there always be gas passageways extending all the way through the substrate to the catalyst layer. In order to ensure that the reactant gas reaches the catalyst layer, it has always been considered necessary to use a hydrophobic substrate which cannot hold significant electrolyte and therefore cannot block the passage of reactant gas through the substrate to the catalyst layer. This is the most common type of electrode in use today. However, in non-circulating electrolyte type cells, it is still necessary to remove excess water by evaporating it into one of the reactant gas streams and/or to be able to store excess electrolyte volume some place within the cell, particularly at shutdown when the water vapor within the gas streams condenses to a liquid. With hydrophobic substrates the condensed water vapor would increase the volume of the electrolyte and may form a film of liquid on the backside or inside the substrate which acts as a barrier to gas flow through the substrate when the cell is put back into operation.

Solutions to the above discussed problems are shown and described in commonly owned U.S. Pat. Nos. 3,779,811 and 3,905,832. In the former patent a porous electrolyte reservoir plate (ERP) is disposed in the reactant gas passage and is spaced from the electrode. Porous pins provide electrolyte communication between the porous plate and the electrode. The electrolyte volume of the cell is controlled by electrolyte movement through the pins of the porous plate, thereby stabilizing the electrochemical performance of the cell and preventing flooding of the electrode. Note that in the embodiment described therein the electrode comprises a conductive nickel screen embedded in a uniform admixture of platinum plus polytetrafluoroethylene particles thereby making the electrode basically hydrophobic. In the U.S. Pat. No. 3,905,832 hydrophilic material is disposed behind and in contact with a hydrophobic electrode substrate to act as an electrolyte reservoir. Communication between the reservoir material and the electrolyte matrix is provided by, for example, holes through the electrode filled with a hydrophilic material or by leaving discrete portions of the electrode substrate hydrophilic to provide wicking paths between the electrolyte matrix and the reservoir material. In this manner excess electrolyte has a place to go without significantly affecting the flow of gas through the hydrophobic areas of the substrate.

While the inventions described in the foregoing two patents work well, they have certain drawbacks. One drawback is increased cell thickness. Another is the increase in IR losses due to either reduced contact between the electrode and separator plate or by the addition of additional material through which the electric current must pass. Increased cost is another problem; this is not only due to the cost of the reservoir layer or material itself, but may also include increased electrode fabrication costs, such as would be required with the invention described in the U.S. Pat. No. 3,905,832.

SUMMARY OF THE INVENTION

An object of the present invention is an electrochemical cell which can accommodate changes in electrolyte volume without flooding or drying out.

According to the present invention, an electrolyte reservoir layer for use adjacent the catalyst layer of an electrochemical cell is hydrophilic, a large portion but not all of the catalyst facing surface of the reservoir layer being impregnated with hydrophobic material to a shallow depth, the reservoir layer also including non-electrolyte retaining portions distributed substantially uniformly throughout the reservoir layer and leading from the non-catalyst facing surface to the hydrophobic material at the other surface and comprising only a small portion of the volume of the reservoir layer.

Unlike electrochemical cells of the prior art, there is no need for separate hydrophobic and hydrophilic layers behind the catalyst. In this invention a large portion of the reservoir layer remains hydrophilic and can retain excess electrolyte. The non-electrolyte retaining portions permit reactant flow to the catalyst layer adjacent the reservoir layer. The hydrophobic material which impregnates the catalyst facing surface permits diffusion of the reactant gas over a large area of the catalyst layer.

In one embodiment of the present invention the non-electrolyte retaining portions are holes from the non-electrolyte facing surface of the reservoir layer to the hydrophobic material. The total cross sectional area of the holes is small in comparison to the cross sectional area of the reservoir layer in order to maximize the volume of the reservoir layer able to hold electrolyte. The reservoir layer also functions as an electrode substrate, wherein the catalyst layer is disposed on the impregnated surface thereof and is bonded thereto.

DESCRIPTION OF THE PREFERRED EMBODIMENTS

Figure 1:
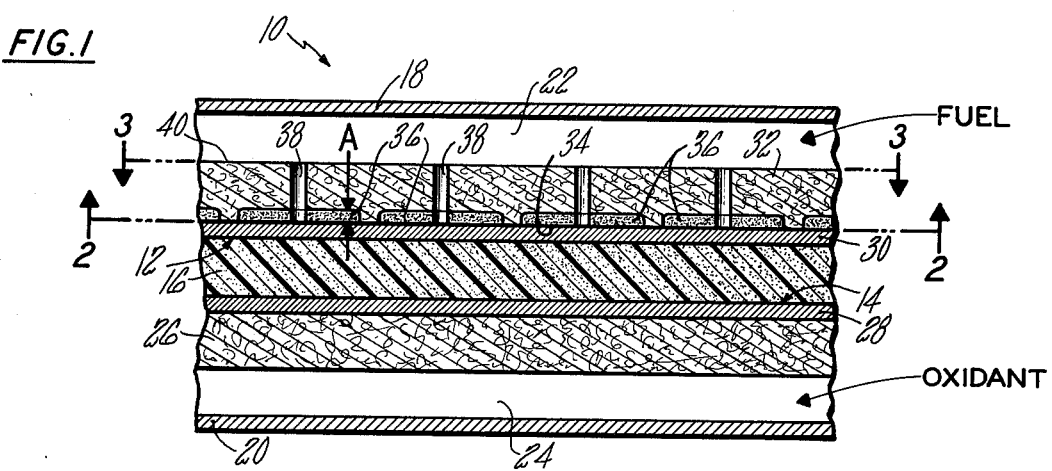
FIG. 1 is a transverse sectional view of an electrochemical cell incorporating the present invention.
Figure 2:
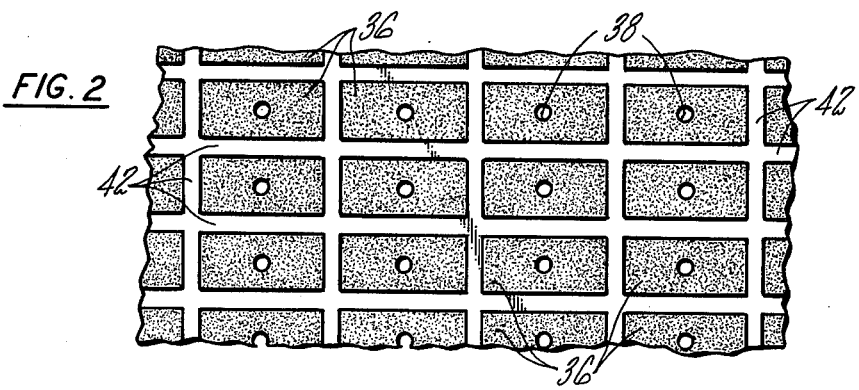
FIG. 2 is a sectional view taken along the line 2—2 of FIG. 1.
Figure 3:
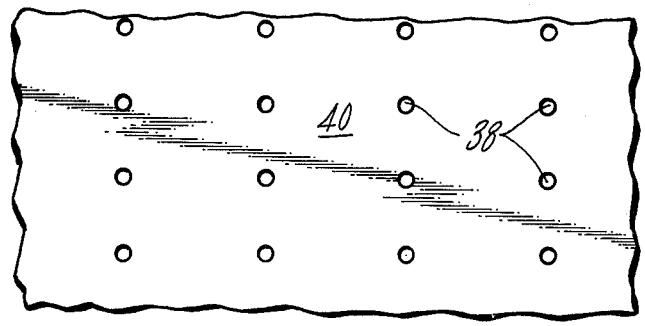
FIG. 3 is a sectional view taken along the line 3—3 of FIG. 1.

As an exemplary embodiment of the present invention consider the electrochemical cell 10 as shown in FIGS. 1-3. The cell includes a fuel or anode electrode 12, a cathode electrode 14, an electrolyte retaining matrix 16 sandwiched between the electrodes and walls 18, 20 spaced from the electrodes 12, 14 and defining a fuel space 22 behind the anode electrode 12 and an oxidant space 24 behind the cathode 14. In a typical stack of fuel cells, wherein the individual cells are connected electrically in series, the walls 18, 20 may be electrically conductive separator plates having fuel flowing on one side thereof feeding the anode electrode of one cell and having oxidant flowing on the other side thereof feeding the cathode electrode of the adjacent cell. Such constructions are well known to those skilled in the art.

The cathode electrode 14 comprises a substrate 26 and a catalyst layer 28 bonded to the surface thereof. In this particular embodiment the cathode electrode 14 is simply a gas diffusion electrode of well known design. For example, assuming that the electrolyte in this embodiment is phosphoric acid, the catalyst layer may comprise an admixture of carbon supported platinum particles and polytetrafluoroethylene (PTFE). The PTFE binds the catalyst particles together and also prevents the catalyst layer from becoming flooded with electrolyte to the exclusion of the reactant gas necessary for the electrochemical reaction. The substrate 26 may be porous carbon paper impregnated with PTFE to make it basically hydrophobic so that it cannot completely fill with electrolyte and prevent reactant gas from reaching the catalyst layer 28.

The anode electrode 12 comprises a catalyst layer 30 and an electrolyte reservoir layer 32. The catalyst layer 30 is bonded to the reservoir layer 32 at the surface 34. The reservoir layer 32 is made from porous material which is hydrophilic to the electrolyte or which has been treated so that it is hydrophilic to the electrolyte. For example, it may be made from carbon paper if the electrolyte is phosphoric acid; or it may be a porous plaque made of silver felt metal, sintered powered silver, gold or other metal if the electrolyte is a base such as potassium hydroxide. Excess electrolyte wicks into and is stored in the reservoir layer 32. The pores of the hydrophilic reservoir layer 32 should be no smaller than the largest pores of the matrix or the largest hydrophilic pores in the catalyst layer so that capillary forces within the reservoir layer will be less than the capillary forces within the matrix or catalyst layer. By this construction the electrolyte will not be drawn into the reservoir layer unless there is more than enough electrolyte to fill the hydrophilic pores of the matrix and the catalyst layer. The surface 34, adjacent the catalyst layer 30, is impregnated to a depth A, over a major portion of its area, with a hydrophobic material or wetproofing agent such as PTFE. These hydrophobic portions are designated by the numeral 36 (FIGS. 1 and 2). The reservoir layer 32 also includes a plurality of holes 38 passing therethrough. The holes 38 start at the non-catalyst facing surface 40 of the reservoir layer 32 and pass through the hydrophobic portions 36. Since the reservoir layer 32 will always be at least partially filled with electrolyte, the holes 38 guarantee a clear path for the reactant gas or fuel to reach the catalyst layer 30. Also, since the hydrophobic portions 36 remain substantially free of electrolyte, the gas will defuse radially outwardly from the holes 38 into these hydrophobic portions thereby being distributed over a large area of catalyst. The hydrophobic area of the surface 34 should be as large as possible so as to maximize utilization of the catalyst in the layer 30. Probably at least 50 percent of the surface will have to be wetproofed in order to obtain satisfactory catalyst utilization and cell performance. With regard to the maximum amount of area which may be wetproofed, the limiting factor is that the nonwetproofed areas 42 (FIG. 2) must have enough surface area to permit ready transfer of the electrolyte between the matrix 16 and the hydrophilic portions of the reservoir layer 32. It is estimated that at least about 2 percent of the surface area of the surface 34 will have to remain nonwetproofed. Also, the nonwetproofed areas 42 should be uniformly distributed over the surface 34.

From the point of view of weight, size, and perhaps cost, it is desirable to make the reservoir layer 32 as thin as possible, yet thick enough to absorb and hold the maximum amount of excess electrolyte which the cell may be expected to produce. With this in mind, it is apparent that the volume of the non-electrolyte retaining portions (i.e., holes 38 and hydrophobic portions 36) should be as small as possible. Thus, the depth A of the portions 36 should be no greater than is necessary to permit ready radial diffusion of the reactant gas from the holes 38 into the portions 36. A minimum of about 3 mils in depth will probably be required; however, depths of up to 50 percent of the reservoir layer thickness may be acceptable in some instances. The diameter of the holes 38 should also be as small as possible in order to maximize the amount of electrolyte which the reservoir layer 32 can retain for a given thickness. However, they should not be smaller than the pore size of the reservoir layer or they will fill with liquid by capillary action. In order that sufficient reactant gas reaches the catalyst layer 30, it is estimated that the sum of the cross sectional areas of the holes 38 should be at least 2% of the total area of the surface 40. Furthermore, although in this embodiment the holes 38 pass completely through the reservoir layer 32, it is really only necessary that the holes lead from the surface 40 to the hydrophobic portions 36. Practically speaking, however, it will probably be very difficult, if not impossible, to have the holes go only part way through the reservoir layer due to the thinness of the layer.

In this embodiment the hydrophobic portions 36 are shown as being rectangular in shape and separate from one another. This is not critical to the present invention. These areas may be circular or even star shaped; furthermore, they may be interconnected. By the same token, the hydrophilic areas 42 at the surface 34 need not be interconnected.

One way of making the reservoir layer 32 is to mask the areas 42 of the surface 34 and apply an aqueous solution of the hydrophobic material plus thickener to the non-masked areas, such as by screen printing. The depth to which the solution impregnates the reservoir layer is controlled by the viscosity of the printing ink and the number of passes made during the screen printing process. For example, if the reservoir layer is carbon paper having a thickness of 13 mils, a mean pore size of 41 microns, and 75% of its pores have a size of from 19-85 microns, the printing ink may have a composition consisting of 225 grams TFE-30, 265 grams of a 2% aqueous solution of Carbopol 934, 500 grams $H_2O$ and 8 ml $NH_4OH$ 28% solution. TFE-30 is made by Dupont and comprises about 60% polytetrafluoroethylene, 34% $H_2O$ and 6% surfactant, by weight. Carbopol 934 is a powder made by B. T. Goodrich; when mixed with $NH_4OH$, a neutralizing agent, a neutral salt is formed which is the thickening agent. The $NH_4OH$ is added after the other ingredients have been combined and stirred so that air bubbles are not present. Inking vehicles and other undesirable volatile ingredients such as surfactants are subsequently volatilized when the catalyst layer is sintered.

Figure 4:
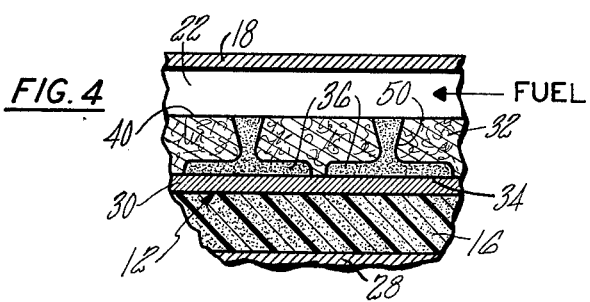
FIG. 4 is a transverse sectional view of an electrochemical cell incorporating another embodiment of the present invention.

Referring now to FIG. 4, another embodiment of the present invention is shown. Elements which are the same as the elements of FIG. 1 are designated by the same reference numerals. The only difference between this embodiment and that of FIG. 1 is that the holes 38 have been replaced by columns 50 of hydrophobic material such as PTFE. These columns are made by impregnating the reservoir layer 32 with an aqueous solution of hydrophobic material in the same way that the hydrophobic portions 36 are formed, except that the hydrophobic material is applied from the opposite side of the reservoir layer. Of course, the hydrophobic ink may have to be less viscous so as to penetrate through to the hydrophobic portions 36. For example, assuming the same carbon paper substrate as mentioned above, the ink may have a composition consisting of 625 grams TFE-30, 660 grams of a 2% aqueous solution of Carbopol 934, 1190 grams $H_2O$ and 20 ml $NH_4OH$ 28% solution. While it may not be possible to fabricate columns 50 with less volume than the holes 38 (FIG. 1), this embodiment provides better protection against reactant gas crossover to the opposite electrode due to the greater pressure drop across the reservoir layer.

Although in the embodiments of FIGS. 1 and 4 the reservoir layer 32 acts as a substrate for the catalyst layer 30 which may be applied thereto such as by spraying, filtering, printing or other suitable means, it should be apparent to those having ordinary skill in the art that the matrix 16 may be used as the catalyst layer substrate rather than the reservoir layer 32. Thus, the catalyst layer 30 may be applied and bonded to the matrix 16 and simply be in intimate contact with but not bonded to the surface 34 of the reservoir layer.

As will also be obvious to those having ordinary skill in the art, the substrate 26 of the cathode electrode 14 may be replaced by a reservoir layer similar to or identical to the reservoir layer 32. However, this additional reservoir volume is usually not required. If only a single reservoir layer is to be used, it is preferred that it be on the anode side of the cell since the anode is more tolerant to reduced availability of hydrogen than the cathode is to reduced availability of oxygen.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. An electrolyte reservoir layer for use adjacent the catalyst layer of a fuel cell, said reservoir layer being porous throughout and including a catalyst facing surface and a non-catalyst facing surface, said catalyst facing surface including first impregnations of hydrophobic material to a shallow depth over a major portion of its area, said catalyst facing surface also including uniformly distributed areas not impregnated with hydrophobic material, said reservoir layer also including uniformly distributed non-electrolyte retaining portions leading from said non-catalyst facing surface to said impregnations of hydrophobic material at said other surface, said non-electrolyte retaining portions comprising only a small portion of the volume of said reservoir layer, said reservoir layer being hydrophilic in all portions other than said non-electrolyte retaining portions and said first impregnations.

2. The reservoir layer according to claim 1 wherein said non-electrolyte retaining portions are holes extending from the non-catalyst facing surface into said first impregnations.

3. The reservoir layer according to claim 1 wherein said non-electrolyte retaining portions are second impregnations of hydrophobic material extending from said non-catalyst facing surface to said first impregnations of hydrophobic material.

4. The reservoir layer according to claim 1 wherein the area of said catalyst facing surface not impregnated with hydrophobic material is at least 2% of the total area of said catalyst facing surface, said depth of said first impregnations is no more than 50% of the thickness of said reservoir layer and no less than 3 mils, and the minimum total cross-sectional area of said non-electrolyte retaining portions is 2% of the total cross sectional area of said non-catalyst facing surface.

5. In a fuel cell comprising an electrolyte retaining matrix, an anode catalyst layer disposed on one side of said matrix and a cathode catalyst layer disposed on the other side of said matrix, each layer including hydrophobic material substantially uniformly distributed throughout, each catalyst layer also including an active area in contact with said matrix, the improvement comprising:

an electrolyte reservoir layer including an active portion in intimate contact with the non-matrix facing side of said active area of at least one of said catalyst layers, said reservoir layer being porous throughout and including a catalyst facing surface and a non-catalyst facing surface, said catalyst facing surface including first impregnations of hydrophobic material to a shallow depth over a major portion of its area, said catalyst facing surface including uniformly distributed areas not impregnated with hydrophobic material, said reservoir layer also including uniformly distributed non-electrolyte retaining portions leading from said non-catalyst facing surface to said impregnations of hydrophobic material at said other surface, said non-electrolyte retaining portions comprising only a small portion of the volume of said reservoir layer, said reservoir layer being hydrophilic in all portions other than said non-electrolyte retaining portions and said first impregnations, said hydrophilic portions having substantially no pores smaller than the largest pores of said matrix.

6. The improvement according to claim 5 wherein said one catalyst layer is said anode catalyst layer.

7. The improvement according to claim 6 wherein said non-electrolyte retaining portions are holes extending from said non-catalyst facing surface into said first impregnations.

8. The improvement according to claim 6 wherein said anode catalyst layer is bonded to said reservoir layer.

9. The improvement according to claim 5 wherein said reservoir layer comprises carbon paper.

10. The improvement according to claim 6 wherein said non-electrolyte retaining portions are second impregnations of hydrophobic material extending from said non-catalyst facing surface to said first impregnations of hydrophobic material, said areas of said catalyst facing surface not impregnated with hydrophobic material being at least 2% of the total area of said catalyst facing surface, said depth of said first impregnations being no more than 50% of the thickness of said reservoir layer and no less than 3 mils, the minimum total cross sectional area of said non-electrolyte retaining portions being 2% of the total cross sectional area of said non-catalyst facing surface, and said depth of said first impregnations being at least 3 mils.

* * * * *